Patented Nov. 22, 1938

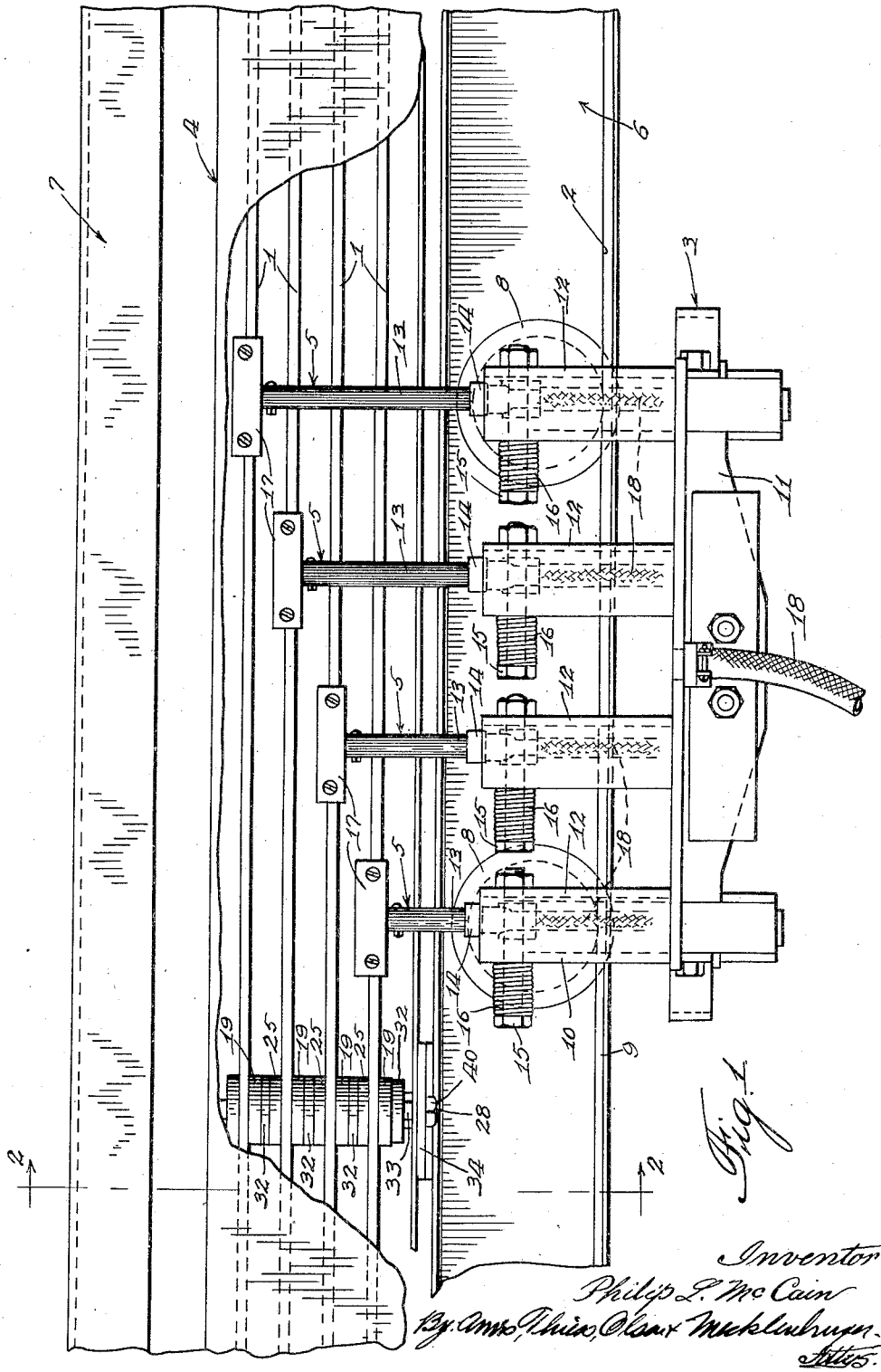

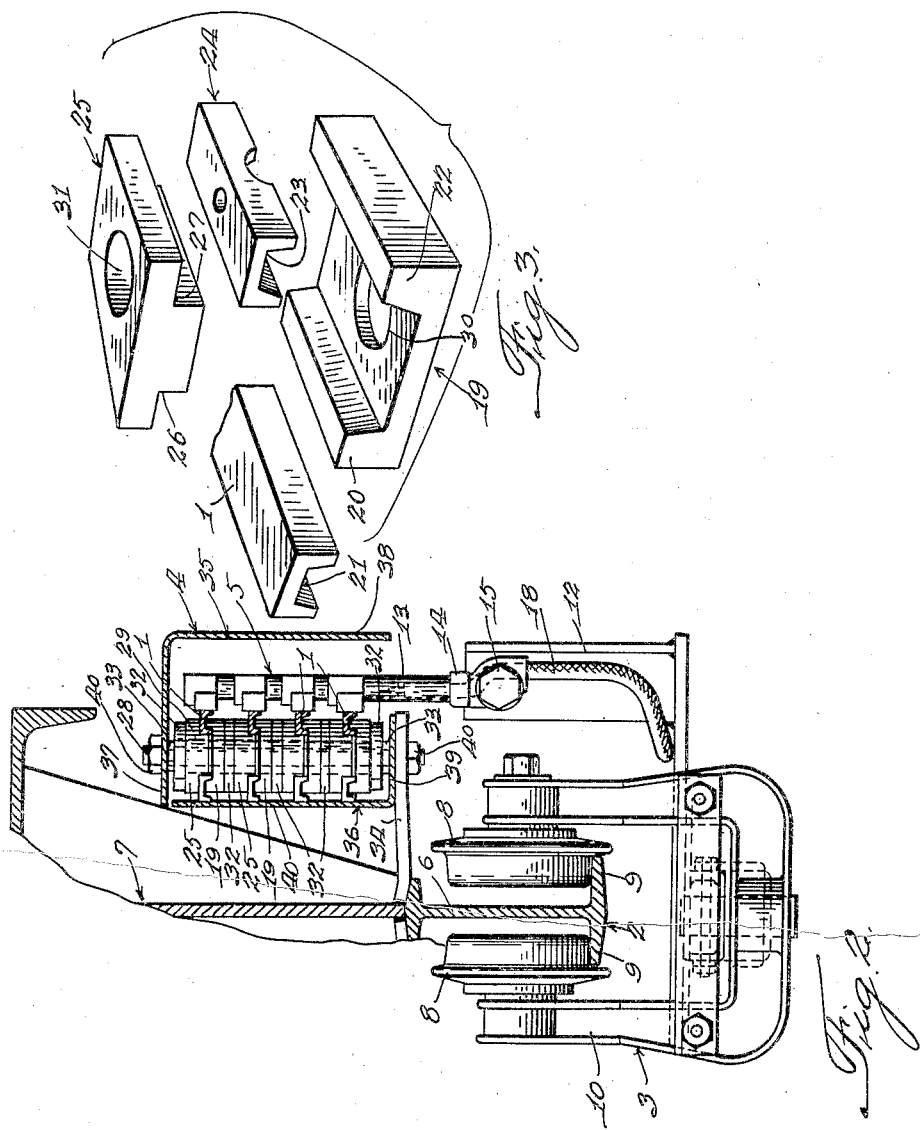

2,137,694

UNITED STATES PATENT OFFICE 2,137,694

SHIELDING FOR ELECTRICAL CONDUCTORS

Philip L. McCain, Pittsburgh, Pa., assignor to The Louden Machinery Company, Fairfield, Iowa, a corporation of Iowa Application September 16, 1937, Serial No. 164,099

2 Claims. (Cl. 247—3)

My invention relates to shielding for electrical conductors.

One of the objects of my invention is to provide an improved shielding construction for a plurality of horizontally extending bus bars extending along a trackway for supplying current to collectors movable along the trackway.

A further object of my invention is to provide such a construction in which the bus bars and insulating spacers may be made up as a subassembly prior to installation.

A further object of my invention is to provide such a construction in which the bus bars are shielded on all sides as far as possible to prevent accidental contact with the bus bars.

A further object of my invention is to provide such a construction which will be durable, simple, efficient and inexpensive.

A further object of my invention is to provide a construction which will enable ready access to the bus bars by removal of only a portion of the shield sections.

Further objects and advantages of the invention will be apparent from the description and claims.

In the drawings, in which an embodiment of my invention is shown,

Figure 1 is a side elevational view showing bus bars, shielding, trackway and trolley;

Fig. 2 is a section on the line 2—2 of Fig. 1; and

Fig. 3 is a disassembled view showing the bus bar mounting.

The construction shown in the drawings comprises a plurality of bus bars 1, four being shown, extending longitudinally with respect to a trackway 2 on which a trolley 3 travels, a metal shielding construction 4 for the bus bars 1, and a plurality of collector wipers 5 carried by the trolley 3 and spring-pressed against the bus bars, respectively, for carrying current from the bus bars to any suitable electrical translating device. While, in the construction shown, the electrical translating device would probably be an electrically-operated tool to which current would be supplied through the collector wipers, it is obvious that a similar arrangement might be used for supplying current to a motor for propelling the trolley or for supplying current to a bridge motor of a crane.

The trackway may be an I-beam 6, supported from a T-beam 7 in any suitable manner, the trolley wheels 8 running on the lower flanges 9 of the I-beam 6. The trolley shown comprises a pair of yokes 10 on which the trolley wheels 8 are mounted and a load bar 11 extending between these yokes 10, on which load bar are mounted the brackets 12 which carry the spring-pressed collectors 5. Each spring-pressed collector 5 comprises a hollow vertically-extending arm 13 which may be of insulating material, such as fibre, each arm being fixed at its lower end to a tubular fitting 14, which tubular fitting is pivotally mounted on a bolt 15 secured to the supporting bracket 12. A coil torsion spring 16 is provided which acts on the arm-supporting fitting 15 to hold the contact wiper 17 of the collector in engagement with its bus bar. A suitable conductor 18 leads from the wiper of the collector through the tubular arm 13 and tubular fitting 14 to a cable 18 which carries all of the conductors to the desired translating device.

The bus bars 1 and the mounting therefor may be made up into a subassembly prior to final installation. The mounting for the bus bars comprises a block 19 of insulating material having a flange 20 which fits in the channel 21 in the bus bar 1 and having an opposite flange 22 which fits in the channel 23 in the short metal spacer member 24 and a second spacer block 25 of insulating material having a recess 26 to receive the corner of the bus bar and having an opposite recess 27 to receive the corner of the channeled spacer member 24.

In putting together the subassembly of bus bars, the insulating spacer blocks 22 and 25, the metal spacer members 24, and the bus bars are assembled as shown in Fig. 2, bolts 28 and insulating sleeves 29 surrounding the bolts are passed through the openings 30 and 31 in the spacer members 22 and 25, insulating washers 32 are slipped over the ends of the bolts 28 and nuts 33 are screwed onto the ends of the bolts 28 and screwed up tightly to clamp the bus bars 1, spacers 19 and 25, spacer members 24 and washers 32 firmly in position. This subassembly may then be handled as a unit in combining it with the shielding construction 4 and mounting brackets 34.

The shielding construction comprises two shielding members 35 and 36, angular in cross section, which may be of metal, one of the angular shielding members 35 having a horizontal leg 37 extending above the bus bars and a vertical leg 38 in front of the bus bars extending downwardly from one edge of the horizontal leg and the other shielding member 36 having a horizontal leg 39 extending underneath the bus bars and a vertical leg 40 extending upwardly from the horizontal leg in the rear of the bus bars.

The front edge of the lower horizontal leg 39 is spaced from the lower edge of the downwardly-extending vertical leg 38 and the downwardly-extending leg 38 is spaced from the bus bars 1 to provide clearance for the collector arms 13 operating in the space in the rear of the downwardly-extending leg 38.

The bus bar and shielding construction may be mounted on suitable brackets 34 which are shown as secured in any suitable manner to the I-beam 6. The shielding construction, bus bars, and insulating blocks are secured on the bracket by means of the bolts 28, the upper ends of which bolts extend through the upper horizontal leg 37 and the lower ends of which extend through the lower horizontal leg 39, and some of which may extend through the supporting brackets 34. Nuts 40 are threaded on the ends of the bolts 28 for securing the shielding members 35 and 36 together and for securing the entire shielded construction in place on the mounting brackets 34.

In operation, as the trolley 3 runs along the trackway 2, the wiper contacts 17 on the collectors will travel along and in engagement with the bus bars 1 against which they are held by means of the coil torsion springs 16.

If it is desirable to gain access to the bus bars, the upper shielding member 35 may be readily removed simply by removing the upper nuts 40 and lifting the upper shielding member 35 away from the bus bars 1. It will be seen that the bus bars 1 are shielded on all sides as far as possible to prevent accidental contact with the bus bars and that the shielding construction permits movement of the collector arms 13 in a narrow space between the lower edge of the downwardly-extending leg 38 and the adjacent edge of the horizontally-extending leg 39.

Further modifications will be apparent to those skilled in the art and it is desired, therefore, that the invention be limited only by the prior art and the scope of the appended claims.

Having thus described my invention, what I claim and desire to secure by Letters is:

1. A shielded conductor construction comprising a plurality of elongated parallel horizontal conductors mounted one above the other, two shielding members angular in cross section, one of said angular shielding members having a horizontal leg extending above said conductors and a vertical leg in front of said conductors extending downwardly from one edge of the horizontal leg and the other shielding member having a horizontal leg extending underneath said conductors and a vertical leg extending upwardly from said horizontal leg in the rear of said conductors, the front edge of said lower horizontal leg being spaced from the lower edge of said downwardly-extending vertical leg and said downwardly-extending leg being spaced from said conductors to provide clearance for a collector wiper operating in the space in the rear of said downwardly-extending leg, insulating spacer means for maintaining said conductors separated, and means extending vertically through said horizontal legs for clamping said shielding members, insulating spacer means and conductors together.

2. A shielded conductor construction comprising a plurality of elongated parallel horizontal conductors mounted one above the other, a shielding construction for said conductors comprising four flat strip members extending substantially parallel to said conductors, one of said strip members extending above said conductors and being horizontal in cross-section, another of said strip members extending below said conductors and being horizontal in cross-section, another of said strip members extending in the rear of said conductors and being substantially vertical in cross-section, and another of said strip members extending in front of said conductors and being substantially vertical in cross-section, the front edge of said lower strip member being spaced from the lower edge of said front strip member and said front strip member being spaced from said conductors to provide clearance for a collector wiper operating in the space in the rear of said front strip member, insulating spacer means for maintaining said conductors separated, and means extending vertically through said horizontal strips for clamping said shielding members, insulating spacer means and conductors together.

PHILIP L. McCAIN.